United States Patent
Li et al.

(10) Patent No.: US 11,463,461 B2
(45) Date of Patent: Oct. 4, 2022

(54) UNEQUAL PROBABILITY SAMPLING BASED ON A LIKELIHOOD MODEL SCORE TO EVALUATE PREVALENCE OF INAPPROPRIATE ENTITIES

(71) Applicant: Microsoft Technology Licensing, LLC, Redmond, WA (US)

(72) Inventors: Wenqian Li, Fremont, CA (US); Zhou Jin, Fremont, CA (US); Rui Zhao, Mountain View, CA (US); Xiaosu Huang, Sunnyvale, CA (US); Chi-Yi Kuan, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 681 days.

(21) Appl. No.: 16/424,972

(22) Filed: May 29, 2019

(65) Prior Publication Data

US 2020/0382530 A1    Dec. 3, 2020

(51) Int. Cl.
| | | |
|---|---|---|
| *H04L 29/06* | (2006.01) | |
| *H04L 9/40* | (2022.01) | |
| *G06N 20/00* | (2019.01) | |
| *G06F 17/18* | (2006.01) | |
| *G06K 9/62* | (2022.01) | |

(52) U.S. Cl.
CPC .......... *H04L 63/1425* (2013.01); *G06F 17/18* (2013.01); *G06K 9/6267* (2013.01); *G06N 20/00* (2019.01)

(58) Field of Classification Search
CPC ... H04L 63/1425; G06F 17/18; G06K 9/6267; G06N 20/00; G06N 7/005; G06N 20/10; G06N 20/20
See application file for complete search history.

(56) References Cited

U.S. PATENT DOCUMENTS

| | | | | |
|---|---|---|---|---|
| 11,126,612 | B2 * | 9/2021 | Gaber | G06F 16/2228 |
| 2010/0070620 | A1 * | 3/2010 | Awadallah | H04L 63/1425 |
| | | | | 709/224 |
| 2013/0041710 | A1 * | 2/2013 | Civil | G06F 17/18 |
| 2013/0185230 | A1 * | 7/2013 | Zhu | G06N 20/00 |
| | | | | 726/22 |

(Continued)

OTHER PUBLICATIONS

Rimoldini, Lorenzo. "Weighted skewness and kurtosis unbiased by sample size." Observatoire astronomique de l'Universife de Gen'eve (2013): 1-33. (Year: 2013).*

*Primary Examiner* — Joseph P Hirl
*Assistant Examiner* — Ka Shan Choy
(74) *Attorney, Agent, or Firm* — Nicholson De Vos Webster & Elliott LLP

(57) ABSTRACT

Techniques for performing unequal sampling are provided. In one technique, multiple scores generated by a prediction model are identified, each score corresponding to a different entity of multiple entities. Multiple buckets are determined, each bucket corresponding to a different range of scores. Each entity is assigned to a bucket based on the score corresponding to the entity. A probability distribution function is generated based on the scores and a number of scores belonging to each bucket. For each entity, a probability of sampling the entity is determined based on the probability distribution function and a score corresponding to the entity. A subset of the entities are sampled based on the probability determined for each entity.

14 Claims, 8 Drawing Sheets

(56) References Cited

U.S. PATENT DOCUMENTS

2017/0262635 A1* 9/2017 Strauss .............. G06Q 30/0275
2018/0300653 A1* 10/2018 Srinivasan .............. H04L 67/06
2019/0034827 A1* 1/2019 Grechka ................ G06Q 50/01
2019/0036966 A1* 1/2019 Lin .......................... H04L 63/20
2021/0049441 A1* 2/2021 Bronstein ................ G06N 3/08

* cited by examiner

UNEQUAL PROBABILITY SAMPLING BASED ON A LIKELIHOOD MODEL SCORE TO EVALUATE PREVALENCE OF INAPPROPRIATE ENTITIES

TECHNICAL FIELD

The present disclosure relates to prediction-based identification of inappropriate entities on a computer network and, more particularly, to sampling potentially inappropriate entities using an unequal probability technique.

BACKGROUND

In order to guarantee user experience and long-term user engagement, some online content providers are equipped with defense systems to capture inappropriate entities that violate their respective Terms of Service (ToS). A defense system may be composed of advanced offline and/or online machine learning models, online rules, and manual rules. A likelihood model is one type of machine learning model that is widely used in multiple contexts, including scenarios of evaluating the trust of user-initiated transactions and behaviors. A likelihood model takes a number of known hazardous features and then predicts the odds of an entity or request being unfavorable to the content provider or other users/members. Actions, such as denying the request, banning the users, etc., are taken based on the likelihood score.

However, due to heterogeneity and dynamics of attackers and consideration of precision/recall balance, existing defense systems are typically not sufficient to detect all inappropriate entities. Therefore, continuous monitoring of the prevalence of inappropriate entities and analysis of shared features by undetected inappropriate entities can evaluate the performance of a defense system and prioritize the defense demands.

One type of continuous monitoring involves human analysis, where human labelers label (or manually categorize) entities that are sampled from all entities, which is a gold standard for differentiating appropriate/inappropriate entities. Human labeling is important to evaluate the prevalence of inappropriate entities, example types of which include accounts, online posts, job postings, online articles, etc. However, for a well-established website, only a very small percentage of "live" entities is inappropriate. Thus, simple random sampling would result in none or very few inappropriate entities being sampled. Furthermore, a human labeler reviewing only good quality entities would lead to click fatigue and would reduce accuracy of review results.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for computing an unequal sampling probability in a highly imbalanced large population. In one technique, a particular distribution is used to simulate a likelihood model score distribution, which is extremely left-skewed. Without such a simulation, simply random sampling would yield lots of entities that have a score that is less than 0.1. In order to sample more entities from the higher score buckets, this technique first fits a probability density function (PDF) y=f(x) using scores and the counts of entities in each score bucket. A sampling probability for each entity is then calculated to be proportional to the reciprocal of f(score). In this way, the entities with higher score but lower frequency will have higher sampling probability.

Embodiments improve computer technology by increasing the chance of successfully sampling inappropriate entities and reducing the standard error of measurement, in light of limited valuable human reviewer resources. Additionally, with the increase in the number of inappropriate entities being sampled and reviewed, human reviewers' click fatigue may be reduced. Embodiments may be applied on multiple types of entities that have an imbalanced distribution. At least some embodiments have the flexibility to add a weight or a log(weight) for each individual entity to adjust sampling probability. At least some embodiments allow for the evaluation of damage of undetected inappropriate entities after human labeling.

System Overview

Figure 1:
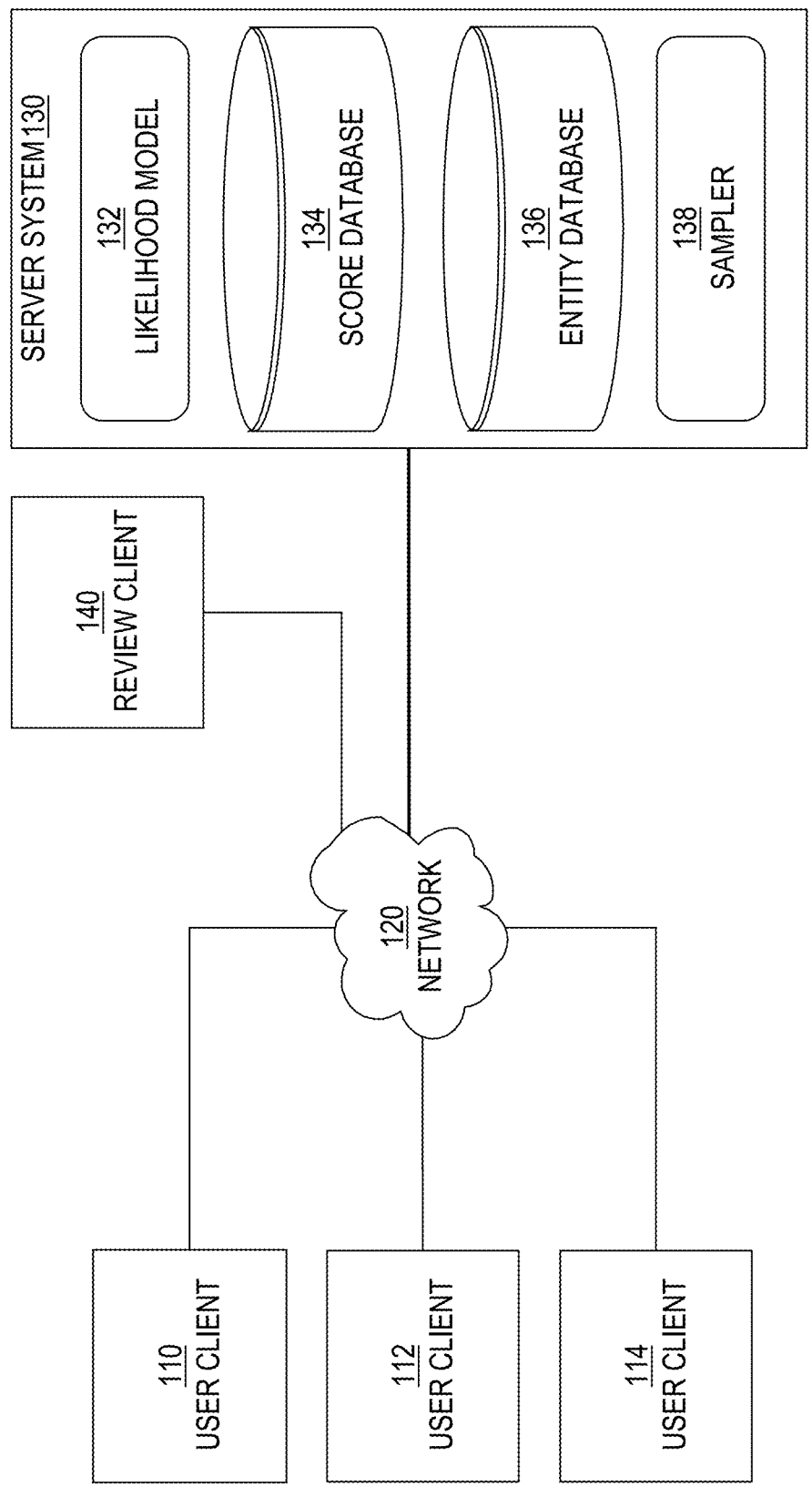
FIG. 1 is a block diagram of an example system for sampling entities, in an embodiment.

FIG. 1 is a block diagram of an example system 100 for sampling entities, in an embodiment. The sampled entities may be provided for manual/human review or to another system for automatic analysis. System 100 includes user clients 110-114, network 120, server system 130, and review client 140.

Each of user clients 110-114 is an application or computing device that is configured to communicate with server system 130 over network 120. Examples of computing devices include a laptop computer, a tablet computer, a smartphone, a desktop computer, and a personal digital assistant (PDA). An example of an application includes a native application that is installed and executed on a local computing device and that is configured to communicate with server system 130 over network 120. Another example of an application is a web application that is downloaded from server system 130 and that executes within a web browser running on a computing device. Each of user clients 110-114 may be implemented in hardware, software, or a combination of hardware and software. Although only three user clients 110-114 are depicted, system 100 may include many more clients that interact with server system 130 over network 120.

Network 120 may be implemented on any medium or mechanism that provides for the exchange of data between user clients 110-114 and server system 130 and between review client 140 and server system 130. Examples of network 120 include, without limitation, a network such as a Local Area Network (LAN), Wide Area Network (WAN), Ethernet or the Internet, or one or more terrestrial, satellite or wireless links.

Server system 130 includes a likelihood model 132, a score database 134, an entity database 136, and a sampler 138. Although depicted as a single element, server system 130 may comprise multiple computing elements and devices, connected in a local network or distributed regionally or globally across many networks, such as the Internet. Thus, server system 130 may comprise multiple computing elements other than the depicted elements. Additionally, although only a single likelihood model 132 is depicted, server system 130 may include multiple likelihood models that generate scores for entities of a particular type or entities of different types. For example, one likelihood model may generate scores for entities of one type and another likelihood model may generate scores for entities of another type.

Review client 140 may be similar to one of user clients 110-114. Review client 140 retrieves data about sampled entities identified by sampler 138 and presents the sampled entities on a screen of a computing device. For each presented sampled entity, the user of review client 140 provides input (or a label) that classifies the sampled entity among one of multiple classes, such as good/bad or fake/possibly fake/not fake. Although only a single review client 140 is depicted, system 100 may include additional review clients that interact with server system 130 over network 120.

Machine-Learned Model

Likelihood model 132 is a machine-learned model that is trained using one or more machine learning techniques. Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values associated with users. The statistical model is trained based on multiple attributes. In machine learning parlance, such attributes are referred to as "features." To generate and train a statistical prediction model, a set of features is specified and a set of training data is identified.

Embodiments are not limited to any particular machine learning technique for training a model. Example machine learning techniques include linear regression, logistic regression, random forests, naive Bayes, and Support Vector Machines (SVMs). Advantages that machine-learned models have over handcrafted rule-based models include the ability of machine-learned models to output a probability (as opposed to a number that might not be translatable to a probability), the ability of machine-learned models to capture non-linear correlations between features, and the reduction in bias in determining weights for different features.

A machine-learned model may output different types of data or values, depending on the input features and the training data. For example, if an entity that is being scored is a user, then training data may comprise, for each user, multiple feature values, each corresponding to a different user-related feature. Example user-related features includes job title, industry, job function, employer, academic degrees, geographical location, skills. Example campaign-related features includes identity of the content provider that initiated the campaign, industry, display characteristics of a content item of the campaign, classification of subject matter of the content item, etc. Examples of account-related features include a date of account registration, a subset of an IP address of the computer used to register the account, a name of the account, a number of online access of the account in the last 24 hours, a number of profile elements of the account that are filled in, a number of profile elements of the account that are left blank, etc.

In order to generate the training data, information about each entity is analyzed to compute the different feature values. In an example where likelihood model 132 scores accounts, each training instance corresponds to a different account. The dependent variable (or label) of each training instance may be whether the account is of one type (e.g., fake) or another type (e.g., real). Thus, some training instances indicate that the corresponding accounts are of one type and other training instances indicate that the corresponding accounts are of another type. The training data may be ensured to include at least a certain percentage of training instances being of a particular type, such as 30% or 50% of all training instances in the training data.

Initially, the number of features that are considered for training may be significant. After training a likelihood model and validating the likelihood model, it may be determined that a subset of the features have little correlation or impact on the final output. In other words, such features have low predictive power. Thus, machine-learned weights for such features may be relatively small, such as 0.01 or –0.001. In contrast, weights of features that have significant predictive power may have an absolute value of 0.2 or higher. Features will little predictive power may be removed from the training data. Removing such features can speed up the process of training future likelihood models and making predictions.

Entities

An "entity" is a person or object that may be scored by likelihood model 132 based on features of the entity. The score reflects a likelihood of being inappropriate or "bad." Examples of entities include a user, a registered member, an account, and any user-generated content, such as an online post (e.g., a job posting), a video, an image, a (e.g., news) article, and a comment. Different entities are associated with different types of features. For example, an article may have textual features while a video has visual features. User-generated content may be associated with user-related features pertaining to the author of the user-generated content.

Process Overview

Figure 2:
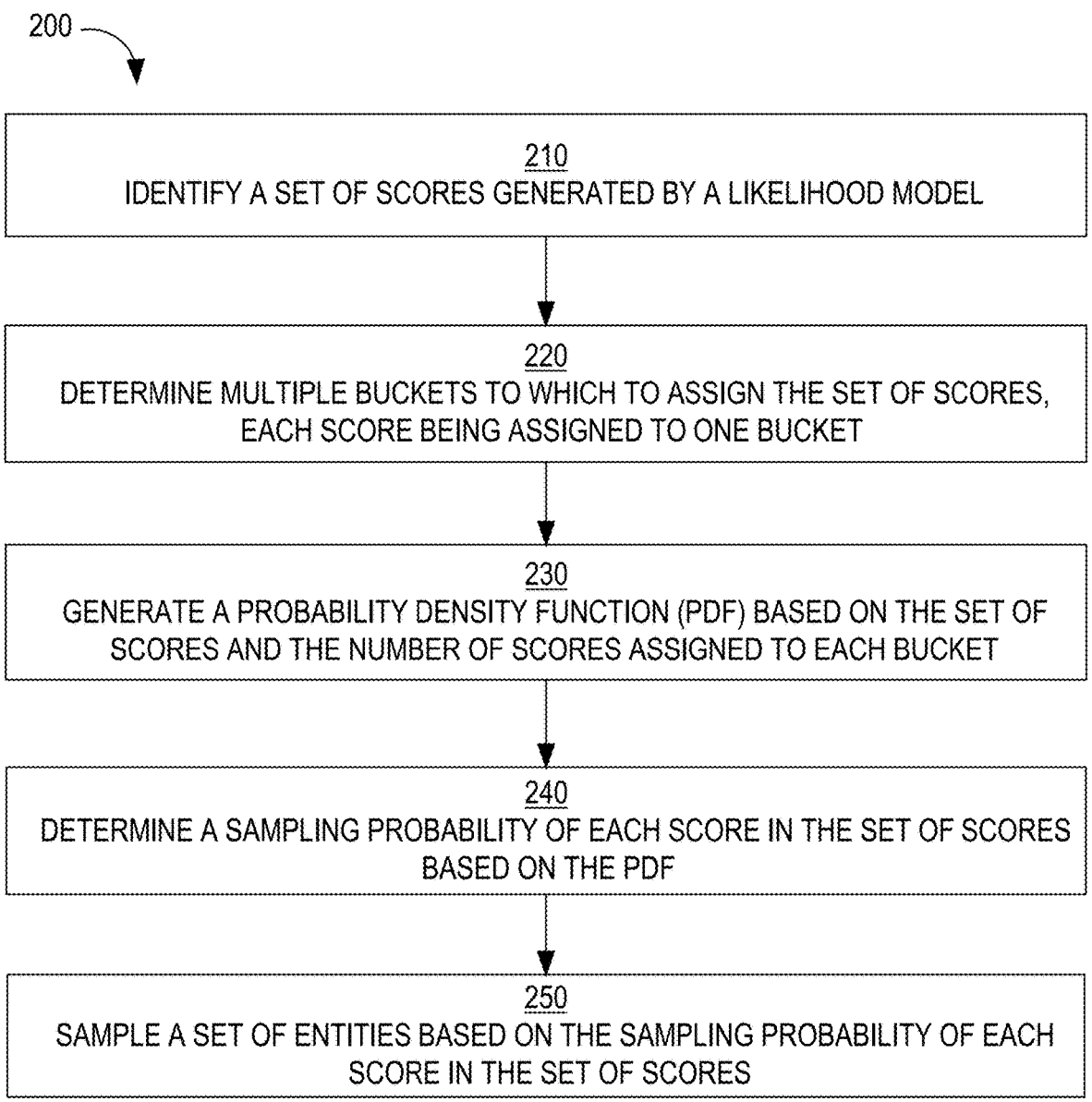
FIG. 2 is a flow diagram that depicts a process for using unequal probability to sample entities from a set of entities, in an embodiment.

FIG. 2 is a flow diagram that depicts a process for using unequal probability to sample entities from a set of entities scored by a prediction/likelihood model, in an embodiment.

At block 210, a set of scores generated by a prediction model is identified, each score corresponding to a different entity of multiple entities. A score may be a floating-point number, such as 0.12519. A range in which the prediction model may produce scores may fall may vary. Example ranges include [0, 1], [0, 100], or any other range of real values, including negative values.

At block 220, multiple buckets are determined. Each bucket corresponds to a different range of scores. While a score may be a floating-point value with many significant digits, a bucket may correspond to fewer significant digits. For example, a bucket may be defined at different on hundredth increments, such as [0, 0.01), [0.01, 0.02), etc. Thus, scores that are greater than or equal to 0 and less than 0.01 will be assigned into the bucket defined by the range of "[0, 0.01)." Similarly, scores that are greater than or equal to 0.01 and less than 0.02 will be assigned into the bucket defined by the range of "[0.01, 0.02)." Each score is assigned (or belongs to) only one bucket. For example, a score of 0.013487 is assigned to the second example bucket above (i.e., [0.01, 0.02)) and a score of 0.009843 is assigned to the first example bucket above (i.e., [0, 0.01)).

Figure 3:
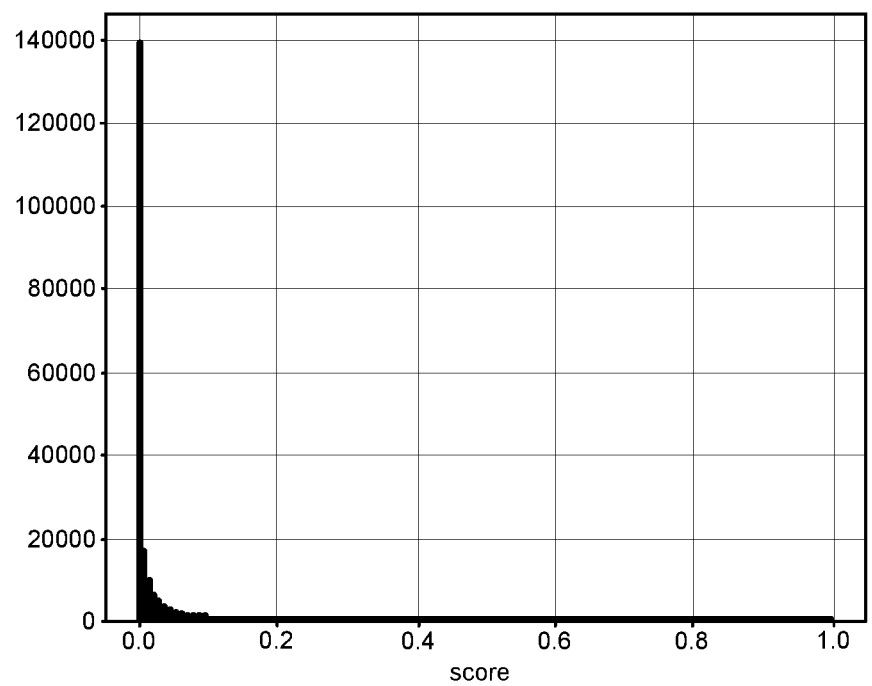
FIG. 3 is a histogram that depicts, per score bucket, a number of entities that are associated with a score corresponding to that bucket.

FIG. 3 is a histogram that depicts an example score distribution (of scores generated by a likelihood model) that is simulated with a Weibull distribution. The histogram indicates, for each score bucket, a number of entities that are associated with a score corresponding to (or falling within a range defined by) that bucket. In this example, the total range of possible scores is between 0 and 1 and the range of each score bucket is relatively small, such as 0.01, though the range of each score bucket may be larger (e.g., 0.05) or smaller (e.g., 0.0001). Also, in this example, there are many entities associated with relatively low scores (or the lowest score) and relatively few entities associated with scores that are even slightly higher than the relatively low scores (or lowest score). In a score distribution from a likelihood model in production, there may be some score buckets (especially score buckets associated with relatively higher scores) that are empty, i.e., are not associated with any scores.

Probability Density Function

At block 230, a probability density function (PDF) is generated based on the set of scores and the number of scores belonging to each of the buckets. A (PDF), or density of a continuous random variable, is a function whose value at any given sample (or point) in the sample space (the set of possible values taken by the random variable) can be interpreted as providing a relative likelihood that the value of the random variable would equal that sample. In other words, while the absolute likelihood for a continuous random variable to take on any particular value is 0 (since there are an infinite set of possible values to begin with), the value of the PDF at two different samples can be used to infer, in any particular draw of the random variable, how much more likely it is that the random variable would equal one sample compared to the other sample. In a more precise sense, the PDF is used to specify the probability of the random variable falling within a particular range of values, as opposed to taking on any one value. This probability is given by the integral of this variable's PDF over that range—that is, it is given by the area under the density function but above the horizontal axis and between the lowest and greatest values of the range. The pdf is nonnegative everywhere, and its integral over the entire space is equal to one.

The PDF is generated such that the curve of the PDF fits a histogram of scores, where the x-axis of the histogram is ordered by score, either increasing scores or decreasing scores. Curve fitting is the process of constructing a curve, or mathematical function, that has the best fit to a series of data points, possibly subject to constraints. Curve fitting can involve either interpolation, where an exact fit to the data is required, or smoothing, in which a "smooth" function is constructed that approximately fits the data.

Embodiments are not limited to any particular technique for fitting a curve to a histogram of scores. For example, block 230 may comprise testing different values of one or more parameters of a PDF function relative to the score distribution until a loss is minimized or until the loss is below some pre-defined threshold. Many statistical packages (e.g., R) and numerical software (e.g., GNU Scientific Library, MLAB, Maple, MATLAB, Mathematica, GNU Octave, and SciPy) include commands for doing curve fitting in a variety of scenarios.

Figure 4:
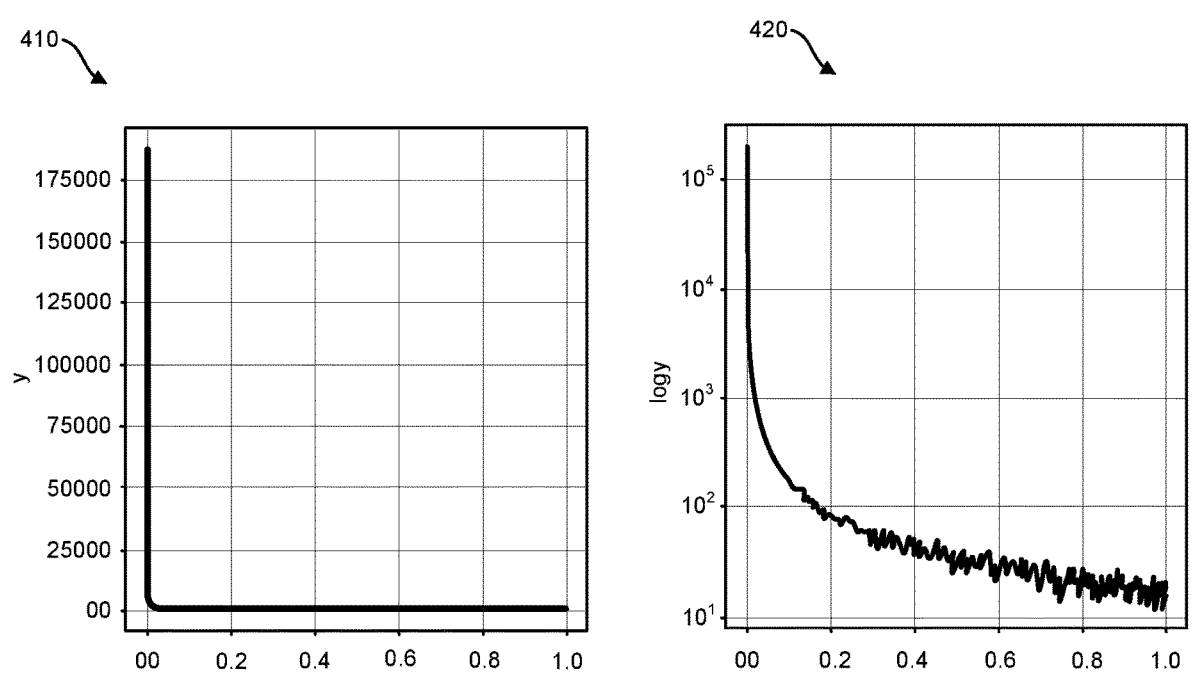
FIG. 4 includes charts pertaining to a probability density function that is fitted to the score distribution indicated in FIG. 3, in an embodiment.

FIG. 4 includes charts 410 and 420 pertaining to a probability density function that is fitted to the score distribution indicated in FIG. 3, in an embodiment. Chart 410 is a chart of a "pure" PDF while chart 420 is a chart of a log of the PDF. Thus, the scales of the y-axis in both figures are different.

In an embodiment, a different distribution of scores will be associated with a different PDF curve. For example, at a later time (i.e., after process 200 is performed relative to one set of scores generated by likelihood model 132), likelihood model 132 (or a variation thereof) may be used to generate another set of scores for the same or different set of entities. Such a different set of scores may be fitted with a different PDF since the different set of scores may have a different score distribution than the previous set of scores. As another example, another likelihood model (that is different than likelihood model 132) generates scores for the same or different set of entities. Such scores are likely to have (or follow) a different score distribution. Thus, a different PDF curve would be generated for the set of scores generated by another likelihood model.

Computing Sampling Probabilities

At block 240, for each score or for each score bucket, a probability of sampling that score (or a score from that bucket) based on the PDF is determined. Block 240 may involve determining a probability for each score or for each bucket. The sampling probability for each score or bucket is calculated based on the reciprocal of f(score), where f(x) is the PDF that is fitted to the histogram of scores. In this way, higher scores that have a lower frequency will have a higher sampling probability.

In an embodiment, to calculate a sampling probability of a particular score, $f(score_i)$ is calculated for all scores i that were generated by the prediction model. The inverse of each f(score) (i.e., $1/f(score_i)=s_i$) is then computed. Then, the sum of the inverse values of all the scores (i.e., $\Sigma s_j$, where $\Sigma$ is from j=1 to j=N, where N is the number of entities or scores that were generated by the prediction model) is then computed. Then, for each entity i, a sampling probability is computed for that entity based on the score for that entity: $s_i/\Sigma s_j$. Thus, the sampling probability for the first score is $s_1/\Sigma s_j$, while the sampling probability for the second score is $s_2/\Sigma s_j$, and so forth.

Figure 5:
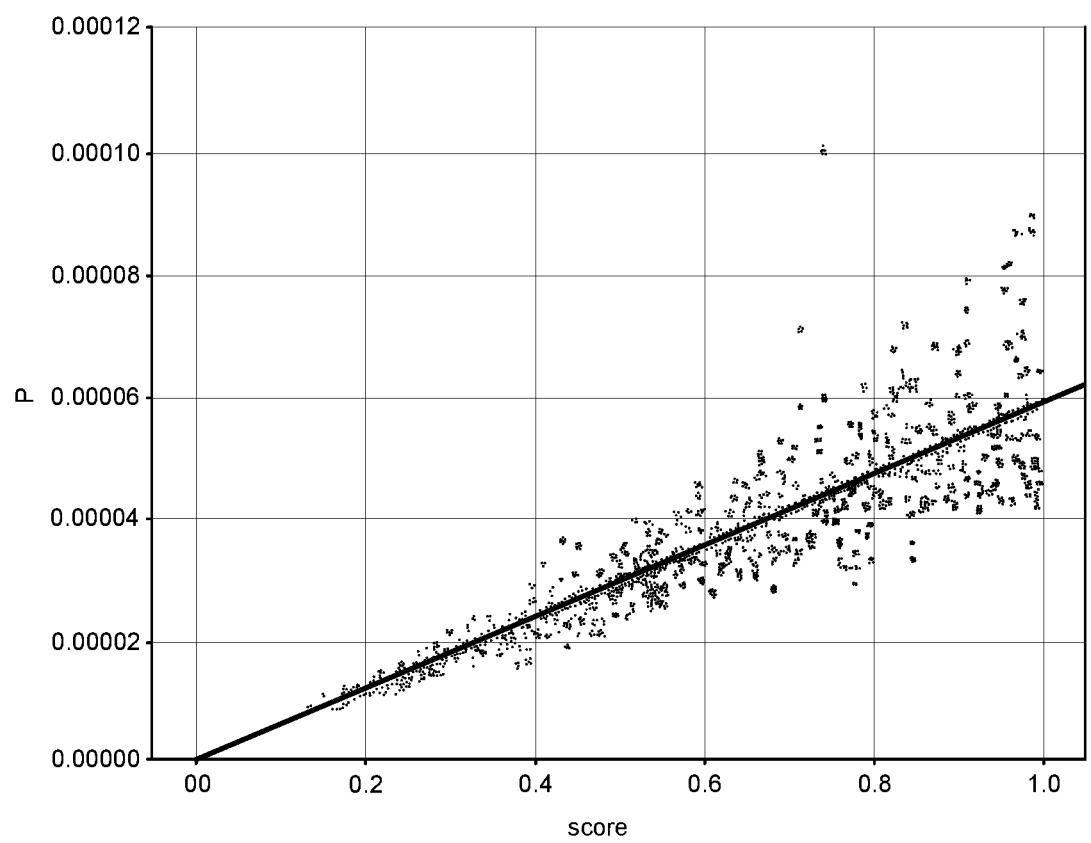
FIG. 5 is a chart that depicts sampling probability as a function of scores, where the sampling probability is calculated using the techniques described herein, in an embodiment.

FIG. 5 is a chart that depicts sampling probability as a function of scores, where the sampling probability is calculated using the techniques described herein, in an embodiment. Each point in the chart represents a different score in the set of scores. As FIG. 5 indicates, the higher the scores, the higher the sampling probability.

Sampling Entities

At block 250, a set of entities is sampled based on the probability of each score in the set of scores. For example, if there are one million entities, one thousand entities may be sampled or selected. The entities associated with those selected scores are identified. Block 250 may involve, for each score associated with a sampling probability, using that sampling probability to determine whether to select the corresponding entity.

One way in which the computed sampling probabilities may be used to select or sample corresponding entities is to first calculate a cumulative probability. For example, entities A-D have the following sampling probabilities: {A, 0.1}, {B, 0.3}, {C, 0.2}, {D, 0.4}. The cumulative probability of each entity is calculated based on the sampling probability of that entity and the sampling probabilities of the entities that precede that entity. For example, the cumulative probability, given the above sampling probabilities, would be as follows: {A, 0.1}, {B, 0.4}, {C, 0.6}, {D, 1.0}. Thus, totaling all the probabilities yields a value of 1. Then, a (e.g., floating point) number between 0 and 1 is randomly generated (e.g., using a random or pseudo-random number generator), such as 0.45. (If the total of the sampling probabilities is greater than one, then the range of values in which a random number generator is limited would be that total value.) Then, a search is performed to identify the next greater value in the cumulative probability, which is 0.6 in this example, since 0.45 is greater than 0.4 (which is associated with entity B). The entity corresponding to that next greater value is then identified and selected, which is entity C in this example. Therefore, the larger the sampling probability of an entity, the larger the gap is between that entity and the preceding entity.

Block 250 may additionally involve causing information about each corresponding entity to be presented to an end-user. For example, data about the sampled entities are provided to review client 140 and, optionally, other review clients, not depicted. For example, data about one subset of the sample entities are transmitted (e.g., over a computer network) to one review client and data about another subset of the sample entities are transmitted to another review client. Example data that is transmitted to review client 140 include a name of the entity, a date associated with the entity's creation or registration, any image/video/text associated with the entity, a public profile page of the entity (if the entity is a person or an organization), and a public profile page of a creator of the entity (if the entity is an online article, an online post, an advertisement, etc.).

Figure 6:
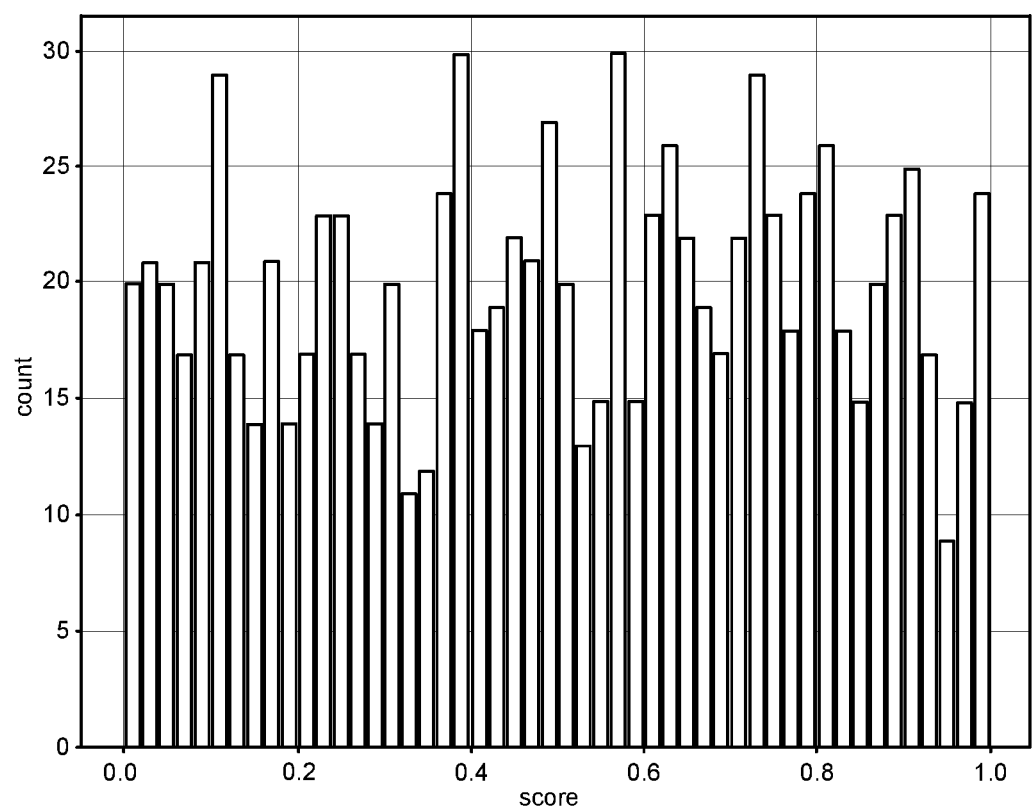
FIG. 6 is a histogram that depicts scores of sampled entities.

FIG. 6 is an example histogram that depicts scores of sampled entities. Each bar in the histogram corresponds to a different range of scores, where each score range is the same size, such as 0.02 in this example. Thus, there are 20 scores that fall into the range [0, 0.02) and 24 scores that fall into the range [0.98, 1.0]. As FIG. 6 indicates, the scores of sampled entities are relatively equally distributed.

Potential Damage

In an embodiment, factors other than score distribution are taken into account when sampling entities. For example, in the context of a likelihood model that predicts whether an account is a fake account, fake accounts with little or no activity will cause little harm or damage, if any, to the system that hosts the accounts. However, a fake account that has a high volume of online visitors and/or online activities will cause greater harm to the system. For example, a user of a fake account may upload user-generated content that is inappropriate and cause that "bad" content to be sent to other accounts to which the fake account is connected in an online (e.g., social) network. As another example, users of "real" accounts may view a profile of the fake account and immediately realize that the account is fake and begin to distrust the account system, hold the account system in low esteem, and/or visit the account system less due to its perceived low utility. A similar scenario applies to situations where the entities are posts, articles, ads, etc.

Thus, in an embodiment, weights are determined based on activity levels and used to adjust the sampling probability. For example, in the context of entities as accounts, multiple activities may be tracked, such as number of messages transmitted from the account, number of posts uploaded from the account, number of advertisements provided by a user of the account (if the account corresponds to a content/advertisement provider), number of advertisements selected by a user of the account, and number of content item (e.g., advertisement) impressions by a user of the account. In the context of entities as posts, multiple activities may be tracked, such as number of user feeds the post has appeared (e.g., number of impressions), number of times other users have selected the post (e.g., number of clicks), number of negative interactions of the post (e.g., number of down votes and/or number of negative comments), etc. Articles and advertisements may have similar activities.

Any value may be used to represent a weight. For example, a message from one account to another may be a value of 0.1. Thus, the sampling probability of the account will increase by multiplying the sampling probability by 1.1. If an entity is associated with multiple instances of a particular activity, then those instances may be added and used to compute a weight. For example, five views of a profile of an account may have a value of 0.15; thus, 0.15*5=0.75. Therefore, the sampling probability of the account will increase by multiplying the sampling probability by 1+0.75=1.75.

In a related embodiment, different activities are associated with different weights. For example, each message transmitted from an account to a recipient may have a value of 0.2, each view (by another user) of a profile of the account may have a value of 0.05, and each click (by a user of the account) of an advertisement may have a value of 0.03.

Weight Adjustment

Figure 7:
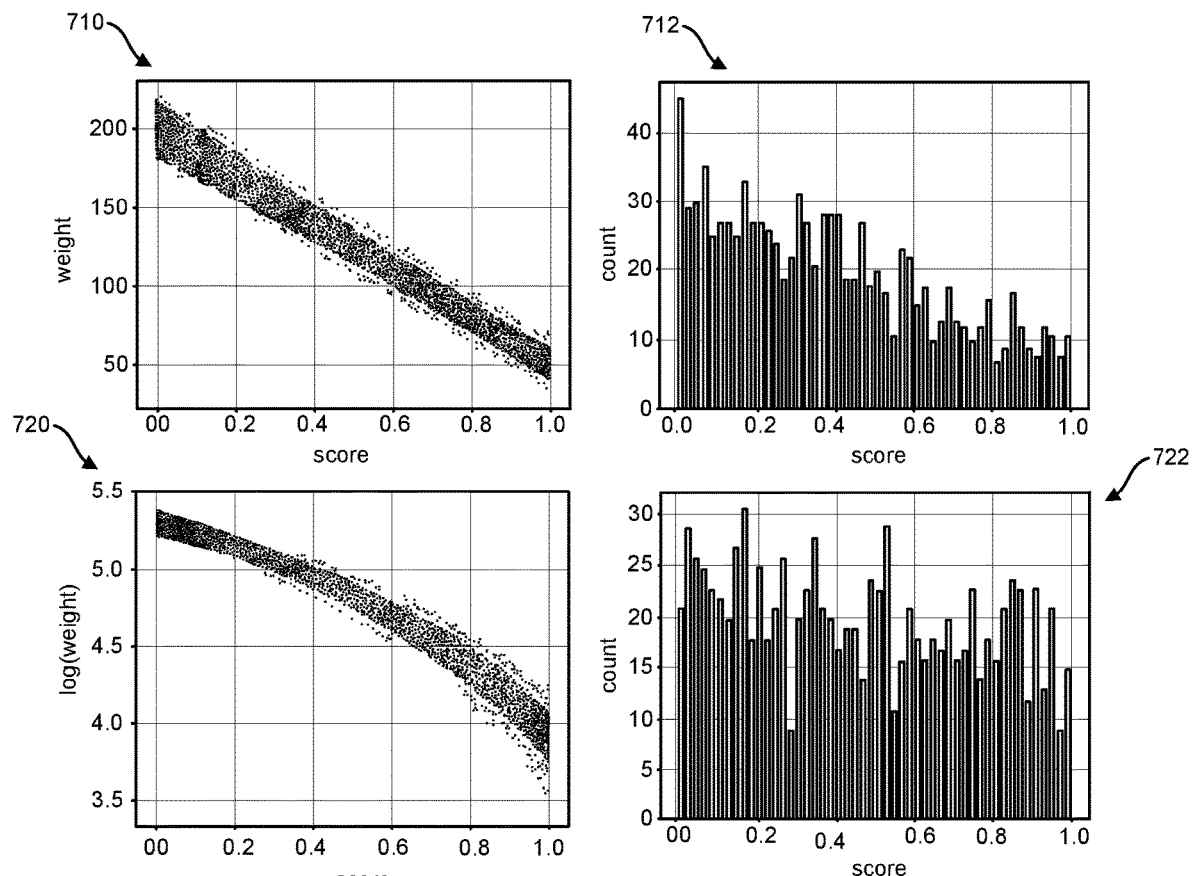
FIG. 7 includes charts and corresponding histograms that depict the effect that factoring in activities of entities has on sampling probability, in an embodiment.

One potential issue is that the weights computed for multiple entities might be highly skewed (with outliers) or might span in a wide range, which would unnecessarily inflate the effects of the added weights. FIG. 7 includes charts 710 and 720 and histograms 712 and 722 of sampled entities.

Chart 710 depicts multiple points, each corresponding to a different entity, each having a score (depicted on the x-axis) and a computed weight (depicted on the y-axis) based on activities of the corresponding entity. Histogram 712 depicts the affect that using the weights to adjust the corresponding sampling probabilities has on the final selection. Because lower scored entities tend to have more activities and, therefore, higher weights, the resulting sampling probabilities will be less uniform across the spectrum of scores and the actual entity selection will be skewed in favor of lower scoring entities, as depicted in histogram 712.

In an embodiment, to address this issue, a log transformation is performed on the original weights before they are applied to "original" (non-weight-adjusted) sampling probabilities. The log transformation may be of any base, such as base 2, base 10, etc. A log transformation (e.g., log(weight)) reduces the high variance of the original weights, shortens the weight range, and eliminates outliers, which will shrink the effects of the original weights but still keeps the trend. This is depicted in chart 720, which depicts multiple points, each corresponding to a different entity, each having a score (depicted on the x-axis) and a log-transformed weight (depicted on the y-axis) based on activities of the corresponding entity.

Histogram 722 depicts entities that are sampled based on sampling probabilities that have been adjusted based on log-transformed weights. Compared to histogram 712, the entity sampling indicated in histogram 722 is more evenly distributed among the differently-scored entities.

Estimating Volume of Undetected Inappropriate Entities

In an embodiment, after human reviewers review and label sampled entities, an estimate of the total number of undetected inappropriate entities (UIE) is computed. For example, the estimate may be performed using the following formula: $(1/N)*\Sigma(l_i/p_i)$, where N is the number of sampled entities, $l_i$ is a human-assigned label of entity i, and pi is the sampling probability for entity i.

In the embodiment where damage is added as a weight for sampling, after human labeling of sampled entities, an estimate of the damage of undetected inappropriate entities (UIED) is computed. The damage estimate may be computed using the following formula: $(1/N)*\Sigma(d_i l_i/p_i)$, where N is the number of sampled entities, $l_i$ is a human-assigned label of entity i, pi is the sampling probability for entity i, and $d_i$ is the damage associated with entity i.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
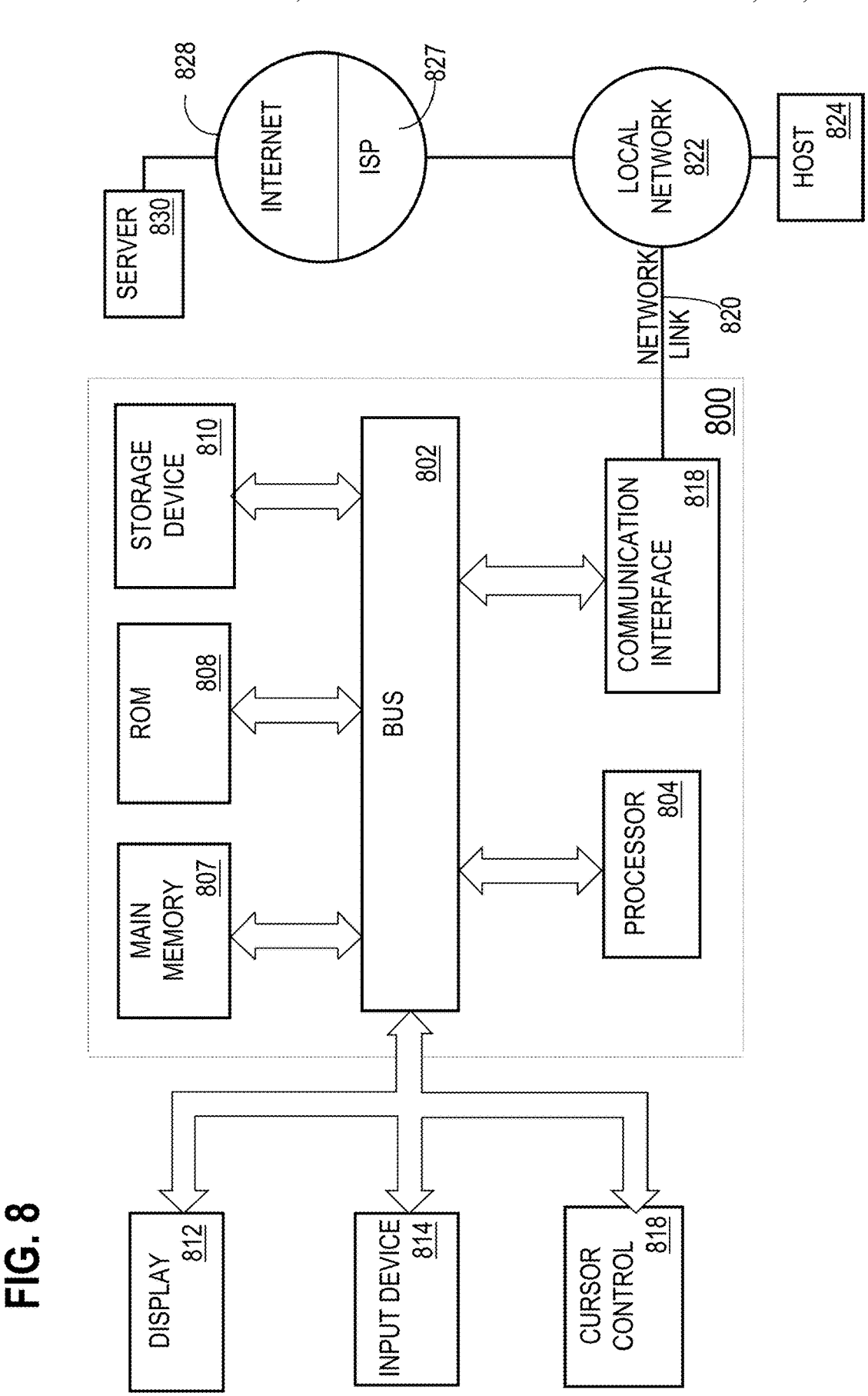
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   identifying a plurality of scores generated by a prediction model, each score corresponding to a different entity of a plurality of entities;
   determining a plurality of buckets, each bucket corresponding to a different range of scores;
   for each entity of the plurality of entities, assigning, based on the score corresponding to said each entity, said each entity to one bucket of the plurality of buckets;
   generating a probability distribution function based on the plurality of scores and a number of scores belonging to each bucket of the plurality of buckets;
   for each entity of the plurality of entities, determining, based on the probability distribution function and a score corresponding to said each entity, a probability of sampling said each entity, wherein an entity having a particular classification in the plurality of entities is unequally distributed among the plurality of entities;
   sampling a subset of the plurality of entities based on the probability determined for each entity of the plurality of entities, wherein the subset of the plurality of entities corresponds to a set of scores;
   receiving, from one or more human reviewers, feedback indicating which entities in the subset of the plurality of entities are associated with the particular classification;
   based on the feedback, generating an estimate of the number of the plurality of entities that are associated with the particular classification, wherein generating the estimate comprises:
   for each entity in the subset of the plurality of entities:
   computing a ratio of (1) a label for said each entity to (2) the probability that was determined for said each entity based on the probability distribution function and the score corresponding to said each entity; and
   adding the ratio to a set of ratios;
   computing a sum of the ratios in the set of ratios; and
   wherein the estimate is based on the sum and a number of entities in the subset of the plurality of entities,
   wherein the method is performed by one or more computing devices.

2. The method of claim 1, wherein:
   each entity of the plurality of entities is associated with an activity measure;
   assigning said each entity to one bucket of the plurality of buckets is further based on the activity measure associated with said each entity.

3. The method of claim 2, further comprising:
   performing a log transformation of the activity measure, wherein determining the probability of sampling the entity is also based on the log transformation of the activity measure associated with the entity.

4. The method of claim 1, wherein the plurality of scores are below a particular threshold that is associated with the prediction model, wherein each bucket of the plurality of buckets is below the particular threshold.

5. The method of claim 1, wherein each entity of the plurality of entities is an account and each score of the plurality of scores is associated with a likelihood that the corresponding entity is a fraudulent entity.

6. The method of claim 1, wherein each entity of the plurality of entities is a content item and each score of the plurality of scores is associated with a likelihood that the corresponding entity is a fraudulent entity, wherein the content item is one of an online article, an online posting, or a job posting.

7. A method comprising:

identifying a plurality of scores generated by a prediction model, each score corresponding to a different entity of a plurality of entities;

determining a plurality of buckets, each bucket corresponding to a different range of scores;

for each entity of the plurality of entities, assigning, based on the score corresponding to said each entity, said each entity to one bucket of the plurality of buckets;

generating a probability distribution function based on the plurality of scores and a number of scores belonging to each bucket of the plurality of buckets;

for each entity of the plurality of entities, determining, based on the probability distribution function and a score corresponding to said each entity, a probability of sampling said each entity, wherein an entity having a particular classification in the plurality of entities is unequally distributed among the plurality of entities;

sampling a subset of the plurality of entities based on the probability determined for each entity of the plurality of entities, wherein each entity of the plurality of entities is associated with an activity measure; and wherein assigning said each entity to one bucket of the plurality of buckets is further based on the activity measure associated with said each entity;

generating an estimate of activity of entities that are estimated to be associated with the particular classification;

wherein generating the estimate comprises:
for each entity in the subset of the plurality of entities:
computing a product of (1) a label for said each entity provided by one of the one or more human reviewers and (2) the activity measure associated with said each entity;
computing a ratio of the product to the probability that was determined for said each entity based on the probability distribution function and the score corresponding to said each entity;
adding the ratio to a set of ratios; and
computing a sum of the ratios in the set of ratios;

wherein estimate is based on the sum and a number of entities in the subset of the plurality of entities, wherein the method is performed by one or more computing devices.

8. One or more non-transitory storage media storing instructions which, when executed by one or more processors, cause:

identifying a plurality of scores generated by a prediction model, each score corresponding to a different entity of a plurality of entities;

determining a plurality of buckets, each bucket corresponding to a different range of scores;

for each entity of the plurality of entities, assigning, based on the score corresponding to said each entity, said each entity to one bucket of the plurality of buckets;

generating a probability distribution function based on the plurality of scores and a number of scores belonging to each bucket of the plurality of buckets;

for each entity of the plurality of entities, determining, based on the probability distribution function and a score corresponding to said each entity, a probability of sampling said each entity, wherein an entity having a particular classification in the plurality of entities is unequally distributed among the plurality of entities;

sampling a subset of the plurality of entities based on the probability determined for each entity of the plurality of entities, wherein the subset of the plurality of entities corresponds to a set of scores, wherein the instructions, when executed by the one or more processors, further cause:

receiving, from one or more human reviewers, feedback indicating which entities in the subset of the plurality of entities are associated with the particular classification;

based on the feedback, generating an estimate of the number of the plurality of entities that are associated with the particular classification, wherein generating the estimate comprises:
for each entity in the subset of the plurality of entities:
computing a ratio of (1) a label for said each entity provided by one of the one or more human reviewers to (2) the probability that was determined for said each entity based on the probability distribution function and the score corresponding to said each entity; and
adding the ratio to a set of ratios;
computing a sum of the ratios in the set of ratios;

wherein the estimate is based on the sum and a number of entities in the subset of the plurality of entities.

9. The one or more storage media of claim 8, wherein:
each entity of the plurality of entities is associated with an activity measure;
assigning said each entity to one bucket of the plurality of buckets is further based on the activity measure associated with said each entity.

10. The one or more storage media of claim 9, wherein the instructions, when executed by the one or more processors, further cause:
performing a log transformation of the activity measure;
wherein determining the probability of sampling the entity is also based on the log transformation of the activity measure associated with the entity.

11. The one or more storage media of claim 8, wherein the plurality of scores are below a particular threshold that is associated with the prediction model, wherein each bucket of the plurality of buckets is below the particular threshold.

12. The one or more storage media of claim 8, wherein each entity of the plurality of entities is an account and each score of the plurality of scores is associated with a likelihood that the corresponding entity is a fraudulent entity.

13. The one or more storage media of claim 8, wherein each entity of the plurality of entities is a content item and each score of the plurality of scores is associated with a likelihood that the corresponding entity is a fraudulent entity, wherein the content item is one of an online article, an online posting, or a job posting.

14. One or more non-transitory storage media, storing instructions which, when executed by one or more processors, cause:

identifying a plurality of scores generated by a prediction model, each score corresponding to a different entity of a plurality of entities;

determining a plurality of buckets, each bucket corresponding to a different range of scores;

for each entity of the plurality of entities, assigning, based on the score corresponding to said each entity, said each entity to one bucket of the plurality of buckets;

generating a probability distribution function based on the plurality of scores and a number of scores belonging to each bucket of the plurality of buckets;

for each entity of the plurality of entities, determining, based on the probability distribution function and a score corresponding to said each entity, a probability of sampling said each entity, wherein an entity having a particular classification in the plurality of entities is unequally distributed among the plurality of entities;

sampling a subset of the plurality of entities based on the probability determined for each entity of the plurality of entities, wherein generating the estimate comprises:
   for each entity in the subset of the plurality of entities:
      computing a product of (1) a label for said each entity provided by one of the one or more human reviewers and (2) the activity measure associated with said each entity;
      computing a ratio of the product to the probability that was determined for said each entity based on the probability distribution function and the score corresponding to said each entity;
      adding the ratio to a set of ratios;
   computing a sum of the ratios in the set of ratios;

wherein the estimate is based on the sum and a number of entities in the subset of the plurality of entities, wherein each entity of the plurality of entities is associated with an activity measure;

wherein assigning said each entity to one bucket of the plurality of buckets is further based on the activity measure associated with said each entity;

generating an estimate of activity of entities that are estimated to be associated with the particular classification.

* * * * *